United States Patent [19]
Koch et al.

[11] 4,219,706
[45] Aug. 26, 1980

[54] STEERING COLUMN MOUNTED CONTROL STALK WITH MULTIPLE ACTUATORS FOR ROTATABLE AND SLIDE TYPE SWITCHES

[75] Inventors: David A. Koch, West Bloomfield; Michael G. Moore, Rochester; Arthur L. Pawlus, Novi, all of Mich.

[73] Assignee: Chrysler Corporation, Highland Park, Mich.

[21] Appl. No.: 925,080

[22] Filed: Jul. 17, 1978

[51] Int. Cl.² .............................................. H01H 9/00
[52] U.S. Cl. .................................... 200/4; 200/61.54
[58] Field of Search ............... 200/4, 17 R, 18, 61.27, 200/61.3, 61.34, 61.35, 61.54, 16 R, 16 C, 16 D; 74/471, 493

[56] References Cited

U.S. PATENT DOCUMENTS

| 3,481,422 | 12/1969 | Mueller et al. | 200/61.54 X |
|---|---|---|---|
| 3,499,125 | 3/1970 | Stoi | 200/61.54 X |
| 3,511,943 | 5/1970 | Kibler | 200/61.54 X |
| 3,761,662 | 9/1973 | Charles | 200/61.54 X |
| 3,859,489 | 1/1975 | Tomlinson | 200/61.54 X |
| 3,934,101 | 1/1976 | Jones | 200/61.27 X |
| 4,006,328 | 2/1977 | Kimberlin | 200/61.54 |

Primary Examiner—James R. Scott
Attorney, Agent, or Firm—Baldwin & Newtson

[57] ABSTRACT

A vehicle steering column mounted control stalk with multiple switch actuators for selective independent actuation of a multiple contact, multiple slide vehicle speed control switch assembly and of a multiple contact rotary and axially translatable windshield wiper motor and washer pump motor control switch assembly.

7 Claims, 13 Drawing Figures

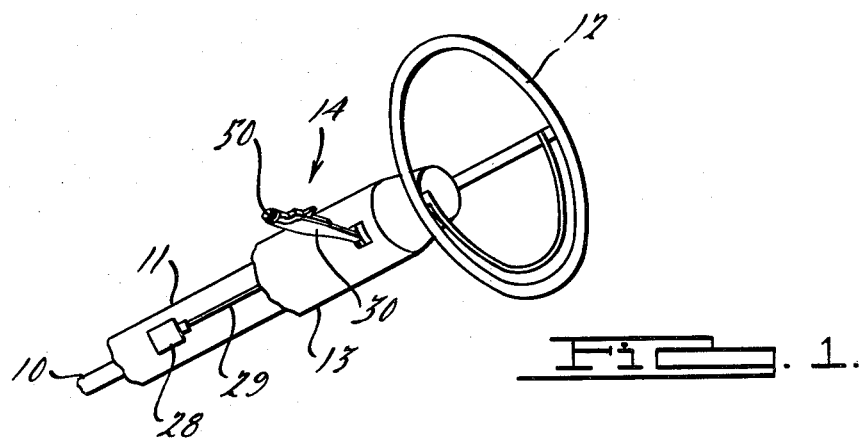
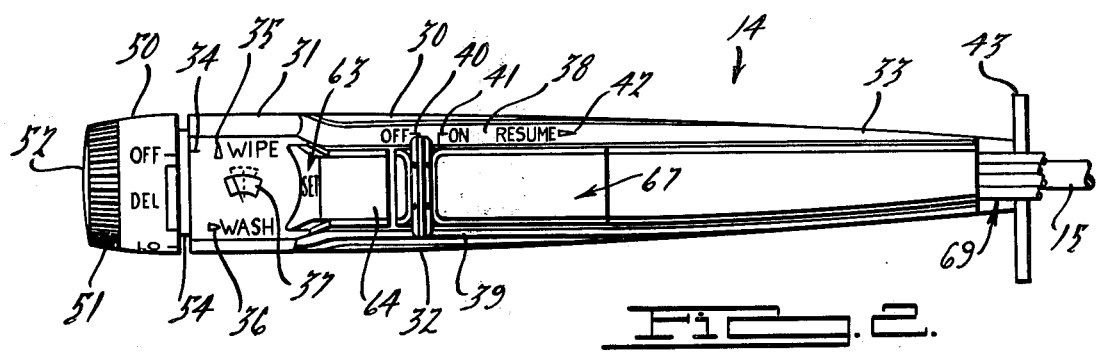
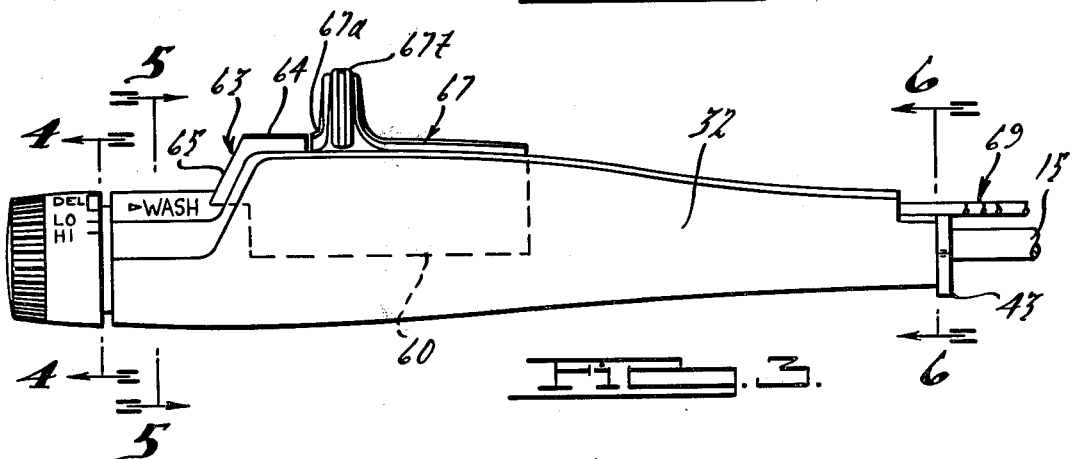
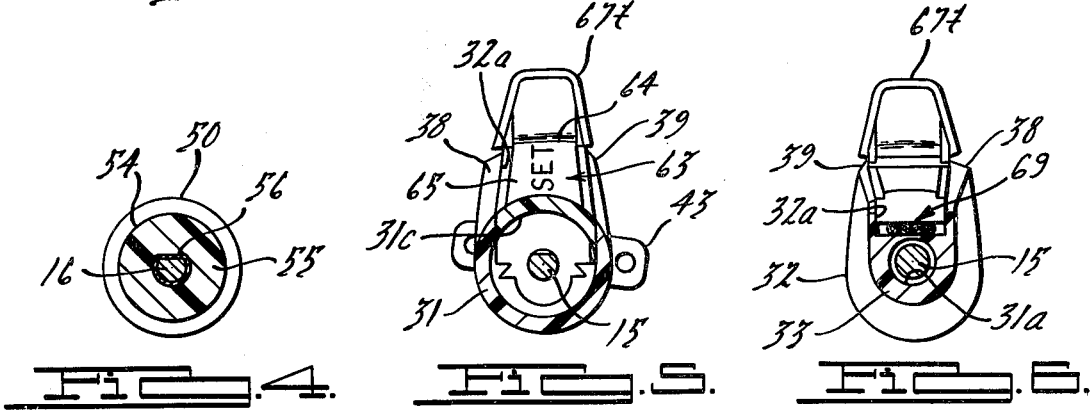

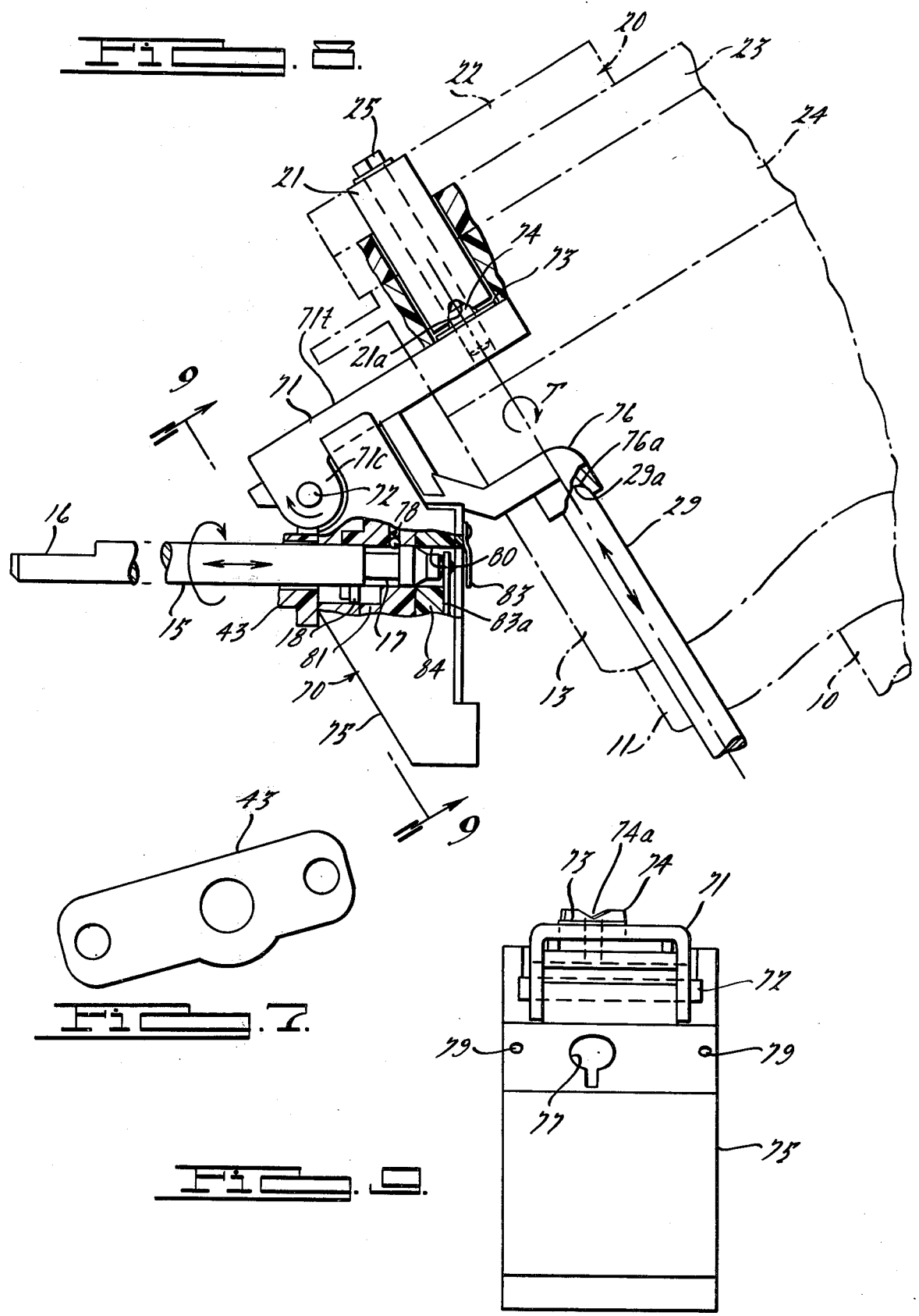

STEERING COLUMN MOUNTED CONTROL STALK WITH MULTIPLE ACTUATORS FOR ROTATABLE AND SLIDE TYPE SWITCHES

FIELD AND BACKGROUND

This invention relates to vehicle steering column mounted control stalks, and, more particularly, to an improved form of control stalk including a plurality of slidable and rotatable switch actuators for controlling a multiplicity of functions in an automotive vehicle with a minimal amount of manipulation from a minimum number of switch actuators thereon.

The form of the control stalk illustrated and described herein is especially suited for use in an automotive vehicle speed control application to provide a selective combined Set and On, or On, Set, Resume and Off control functions from conjoint and/or selective actuation of a pair of juxtaposed slidable actuator buttons carried on a handle surrounding the steering column-mounted control lever. The latter may be the turn signal lever customarily provided on present forms of vehicles. At its free or outer end, the control stalk receives an axially translatable and rotatable actuator knob, which is located adjacent the aforesaid slidable actuators on the control handle and is secured to the control lever to provide actuation of a control switch for actuating a windshield wiper washer pump motor. In addition, the control knob affords a selection of electronically controlled variable delay intermittent wipe intervals over a limited range of rotary movement of the knob we well as continuous Lo-speed and Hi-speed windshield wiper drive motor controls including a return to an OFF control position. The control lever, moreover may be further mounted for swingable movement in a first plane transverse to the longitudinal axis of the sterring column for turn signal actuator application and in another intersecting plane, which is mutually orthogonally related to the first plane and contains or is parallel to the longitudinal axis of the steering column, for headlamp beam selection and/or light modulated signalling applications.

Related forms of control stalks for speed control applications are willustrated by U.S. Pat. Nos. 3,481,422; 3,499,125 and 3,761,662, while U.S. Pat. Nos. 3,413,427; 3,511,943; 3,859,489; 3,881,076; 3,934,101; and 3,988,574, illustrate control stalk applications for multiple function control of windshield wiper motor and washer functions.

The present invention seeks to provide an improved form of control stalk for providing, with a minimum amount of manipulative movements, a plurality of up to nine or ten additional and different vehicle speed control and windshield wiper washer functions from a minimum number of or three switch actuators having a most convenient and facile arrangement on an elongated operating control handle mounting said actuators and surrounding the steering column mounted stalk lever.

The stalk is further associated with a column mounted vehicle turn signal switch with lane changing features and with a column mounted headlamp beam selector or dimmer switch with Hi-beam flashing capability and provides up to eight additional signalling applications and/or functions from the control stalk.

The above and other objects, advantages and features of the invention will appear more fully from consideration of the following detailed description made with reference to the accompanying drawings.

DESCRIPTION OF THE DRAWINGS

FIG. 1 illustrates a vehicle steering column-mounted control stalk environment in which the present invention is employed;

FIG. 2 is a frontal or top plan view, as viewed from the seating position of an operator of the control handle and actuators of the control stalk of the present invention as employed in FIG. 1;

FIG. 3 is a side elevation view of the control handle of FIG. 2;

FIGS. 4, 5, 6 and 7 are transverse sectional views and an end view taken in the directions 4—4, 5—5, and 6—6 of FIGS. 3 and 4;

FIG. 7 is a view of a bracket on the inner end of the control handle of FIG. 2;

FIG. 8 is a fragmentary side elevation view with parts broken away of the yoke or motion translating assembly and the vehicle steering column to which the operating handle of the present invention is affixed.

FIG. 9 is a frontal view of the motion translating assembly with the control lever removed and taken in the direction 9—9 of FIG. 8;

DESCRIPTION OF THE PREFERRED EMBODIMENT

Figure 10:
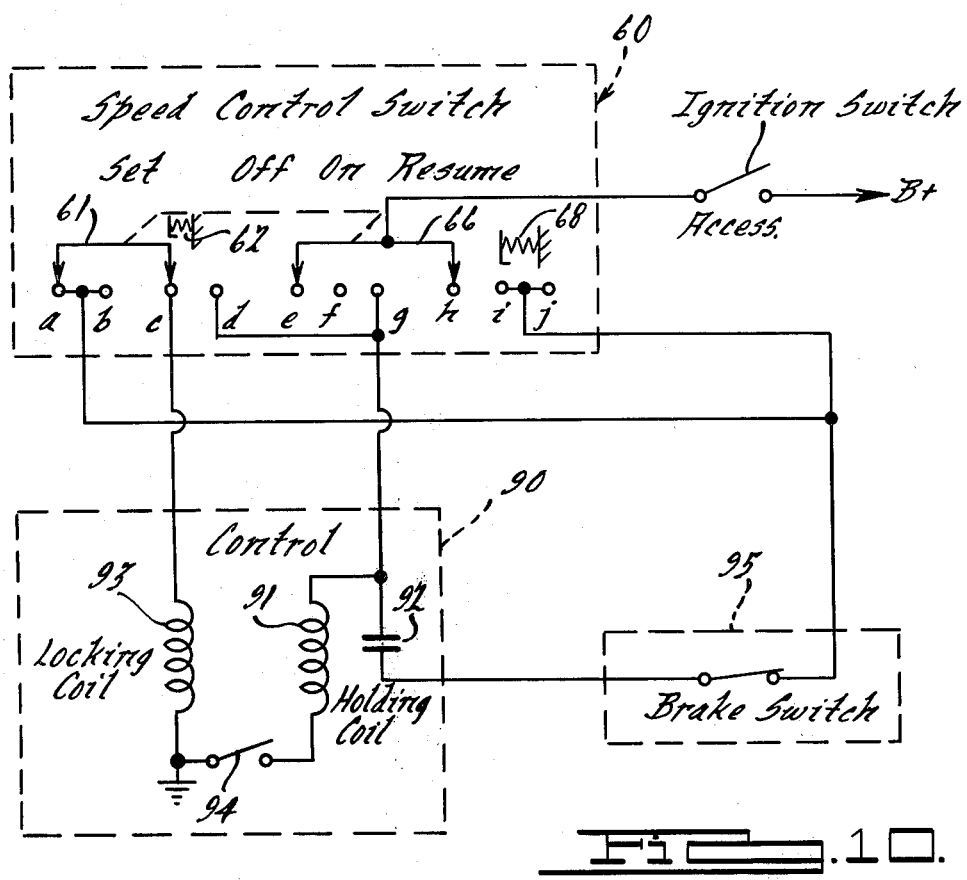
FIG. 10 is an electrical schematic representation of the switches and wiring circuits controlled by the vehicle speed control switch actuators of the control stalk handle of the present invention.

With reference to the drawings, FIG. 1 illustrates a rotatable steering shaft 10 enclosed in a stationary cylindrical jacket or column 11 and mounting a movable steering wheel 12 at one end thereof. Extending from one side of and in a direction transverse to the longitudinal axis of the column is a control stalk assembly 14 surrounding a central control shaft or lever 15, which may be the swingably mounted actuator or lever for the vehicle turn signal control switch assembly 20. The turn signal switch may be of the general type with lane change signalling features currently supplied by Essex International, Inc. as illustrated in U.S. Pat. No. 3,372,252, for example and is mounted below and coaxially of the steering wheel 12 on a stationary bearing plate 24 shown in FIG. 8 as attached to the upper end of the column 11. The control lever further may be swingably mounted in a second plane, which is mutually orthogonally related to the turn signal actuation plane and include or is parallel to the longitudinal axis of the column, for actuation of a vehicle headlight dimmer switch 28. The dimmer switch 28 is mounted along the column 11 and provides for manual Hi-Lo beam selection and/or cyclical interrupting Hi-beams signalling sometimes called "optical horn", applications, the latter being accomplished from partial swingable movements of the control lever in the aforesaid second plane.

The illustrated operating handle 30 is a hollow elongated tubular, molded plastic structure having a short cylindrical outer end section 31 of generally circular cross-section; an elongated channel-shaped, palm fitting intermediate section 32; and a tubular inner end section 33. On the outer end section 31 is a short horizontal index or graduation 34 and a pair of spaced apart triangular or arrow-shaped indicia 35, 36 between which is located an arcuate sector-shaped windshield wiper symbol depicted at 37 and bearing the legend "WIPE". Adjacent the inwardly directed arrow 36 is the legend "WASH".

Extending from the outer end section of the handle is a circular control knob 50, which has a circumferentially knurled or fluted outer end portion 51 and a stepped or reduced inner end 54. The reduced end 54 of the knob 50 is received within the counterbored end 31c; of the outer end section 31 of the handle, which has a longitudinally extending central bore 31a therethrough in which is received the lever 15. As shown in FIGS. 4 and 8, the control knob is releasably attached by an expandible circular spring 56, which is contained within a central section 55 of the knob, to a D-shaped section 16 at the outer end of the control lever 15 in the manner of radio volume and tuner control knob and shaft assemblies, for example.

The intermediate section 32 of the operating handle or cover 30 is of integral molded formation with and is of somewhat greater longitudinal extent than the outer end section 31. With reference to FIG. 5, the intermediate section 32 has a pair of upwardly or forwardly extending, spaced-apart and curved side walls 38, 39 of which the wall 38 is somewhat thicker than wall 39 for reception and display of a pair of spaced apart, inverted and oppositely directed or facing L-shaped graduations 40, 41 and legends or indicia thereon, including OFF, ON and RESUME, and an inwardly directed arrow shaped graduation 42, as shown in FIG. 2. The spaced apart walls 38, 39 of the intermediate section 32 define the aforementioned channel 32a having a longitudinal extending opening from one side of the handle in which is received the plural slide switch assembly 60 depicted schematically in FIG. 10 for controlling the vehicle speed control functions and the actuators therefor described hereinafter.

The tubular inner end section 33 of the operating handle 30 may be of integral formation with the intermediate section 32 and has an integrally formed flanged bracket 43 shown in FIG. 7, by which the handle is affixed to a longitudinally immovable portion of a motion translating assembly 70, also called a yoke herein. The motion translating assembly forms the subject matter of related and copending U.S. patent application Ser. No. 925,079, filed of even date and of common ownership therewith and enables the aforesaid swingable movements by the operator of the control stalk assembly 14 to be separately translated, coupled or transferred to selectively actuate the headlamp dimmer switch and the vehicle turn signal switch.

Figure 12:
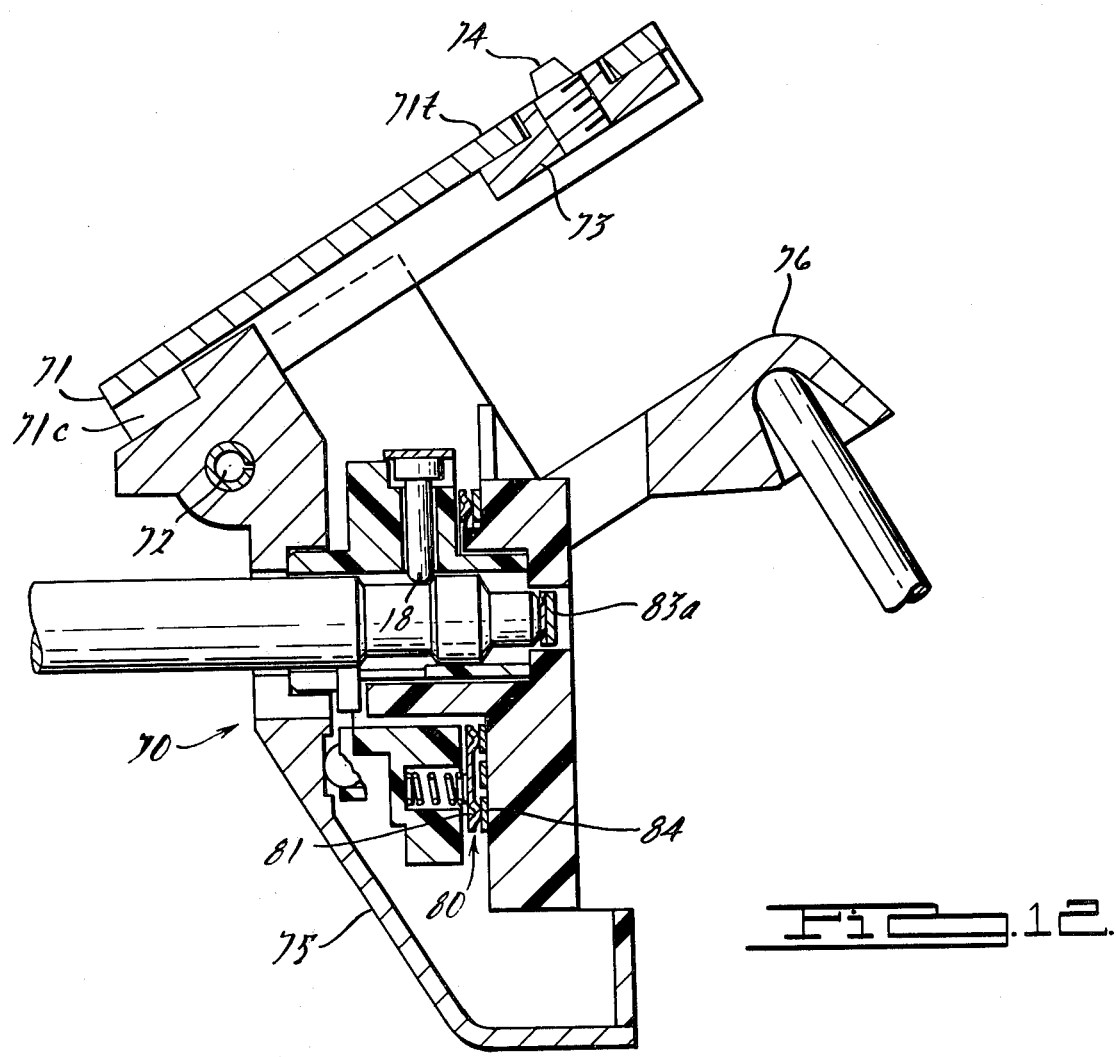
FIG. 12 is an enlarged view of a form of motion translating assembly, similar to FIG. 8, with further details of construction thereof.

As shown in FIGS. 8, 9 and 12, the motion translating assembly 70 is movably pivotably mounted relative to the turn signal switch bearing plate 24, which is fixedly attached to the upper end of a short cylindrical lock housing 13 surrounding the jacket 11 and the upper end of the column shaft 10. Affixed to and carried on the upper surface of the bearing plate 24 is the stationary contact carrying portion 23 of the turn signal switch assembly 20, the movable contactor portion 22 of which is carried on the upper surface of the stationary contact carrying portion 23, as shown. The motion translating assembly 70 comprises a first portion 71 and a second portion 75 of which the first portion has a tongue member 71t extending inwardly toward the steering column 10 from an inverted U-shaped channel or clevis portion 71c at its outer end where it is pivotally mounted on a fixed pin 72 carried in the second portion. The second portion of the motion translating assembly is shown as a depending yoke-shaped block or housing 75 which contains a pair of switches therein for the windshield wiper motor and washer pump motor control functions and also provides an actuator for the headlamp beam selection or dimmer control function. Suitably fastened, as by staking, in the switch housing 75 is a depending lever or arm portion 76, which has a cup-shaped pocket 76a formed therein and extends from one side or face of the switch housing 75 inwardly or toward the steering column 11 where it engages the rounded upper end of a rod 29 extending longitudinally of the column.

The other end 29a of the rod 29 engages an upwardly or outwardly spring biased actuator of the S.P.D.T. headlamp HI-LO beam selector or dimmer switch 28 fixedly mounted on the exterior of the column 11, whereby swingable movement of the control lever 15 in a direction upwardly or toward and downwardly or away from the operator and in a plane containing or parallel to the plane of the steering column pivots the entire block housing 75 and not the tongue member 71 about the generally horizontally extending pivot 72 to longitudinally reciprocate the rod 29.

As shown in FIG. 8, the control lever 15 has a circumferential groove 17 and a radially extending pin 18 near the inner end thereof, which is received in a keyhole shaped slot 77 in the switch block housing 75 and in an aligned opening in the windshield wiper motor and washer pump motor control switch assembly 80. The control lever 15 is resiliently releasably retained by a spring urged pin 78 in the switch assembly 80, which is mounted in the housing 75 to which the control lever 15 is releasably fastened and mounted for rotative as well as for limited longitudinal axial movement. Mounting holes 79 are provided on the outer face of the housing 75 to which the bracket 43 on the inner end of the control handle 30 is fastened by self-tapping screws (not shown), whereby the control handle is fixed against movement relative to the housing 75.

The control lever 15 may thus be rotated or pushed via the control knob 50 for rotational or limited axial longitudinal movement relative to the control handle 30, which is pivotally and swingably mounted with the control lever to accomplish the aforementioned headlamp beam selection or dimming actuation functions described above and the actuation of the turn signal switch. Actuation of the turn signal switch from the control lever 15 pivots the entire motion translating assembly 70 about the turn signal switch pivotal axis shown as a generally vertically extending axis T normal to and passing through the end of the tongue 71 opposite the generally horizontally extending pivot 72 thereof. Affixed on one end of the tongue 71 is a threaded formed nut 73 with a V-shaped notched nib 74 thereon. The nib of the nut is located at the aforesaid vertical pivot axis T and is received within a slotted complementary V-shaped end portion 21a of a cylindrical drive transmitting sleeve or post 21 the upper end of which is molded in or otherwise suitably affixed to the movable switch contactor portion 22 of the turn signal switch. The lower end of the sleeve 21 passes freely through the stationary bearing plate 24 and the stationary contact carrying portion 23 of the turn signal switch 20. Sleeve 21 is fastened to the movable switch contactor actuator portion 22 to move the latter relative to stationary portion 23 and the bearing plate 24 upon oscillation or rocking movement of the sleeve, which is secured to the nut 73 on tongue 71t of the aforesaid the first portion 71 of the motion translating assembly by a threaded screw 25.

As the pivot axis T of the turn signal switch is aligned with the longitudinal axis of rod 29, oscillation of the yoke assembly 70 by the control lever 15 about the vertical axis T of the turn signal switch will not reciprocate the rod 29, while up and down movement of the control lever rocks the second portion or housing block 75 of the motion translating assembly 70 about the pivot pin 72 to reciprocate the rod 29 without affecting the turn signal switch. It will be further appreciated that the simple fastening of the tongue of the motion translating assembly to the conventional turn signal switch by way of the threaded fastener screw 25 avoids the necessity of additional interposed or intervening parts without extensive modification of the turn signal switch.

Figure 11:
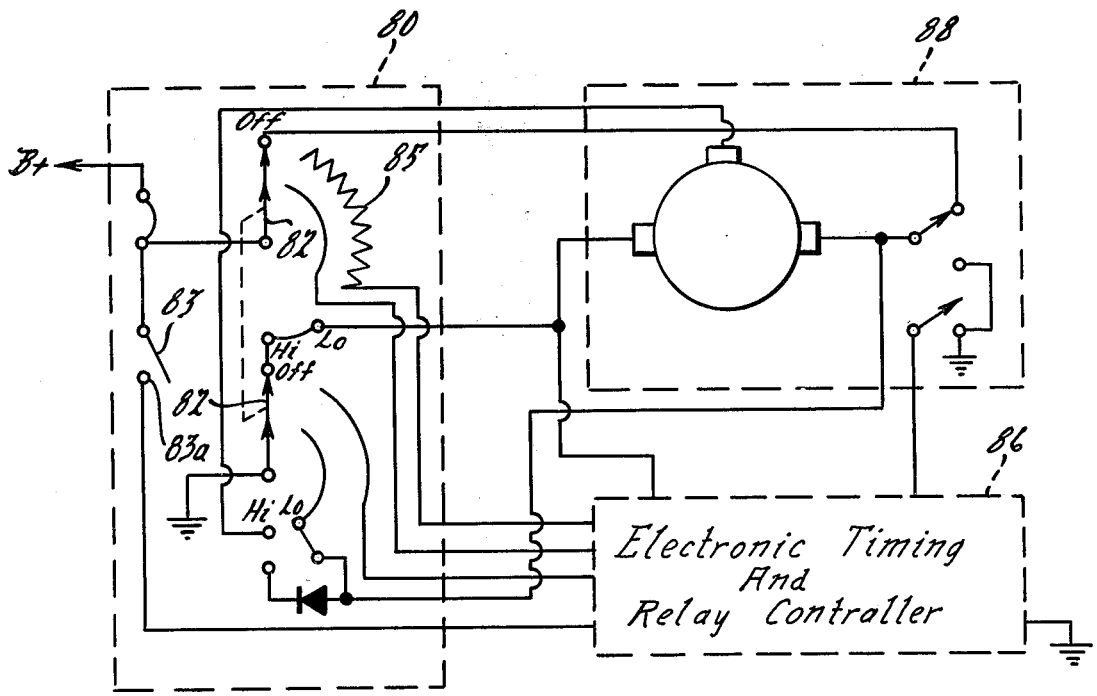
FIG. 11 is an electrical schematic representation of the windshield wiper drive motor and washer pump motor switches and circuits controlled by the windshield wiper and washer actuator or the control stalk handle of the present invention.

The windshield wiper motor and washer pump motor control switch assembly 80 as further depicted in FIG. 11 comprises a ganged two-pole rotary wiper switch 82 rotatively indexable into three detentable positions by rotation of the control lever 15 by the control knob 50 from an OFF to separate Lo-speed and Hi-speed control positions and further contains a washer pump motor control switch 83, 83a. Switch 83 is actuable from a normally open to a momentary switch contact completing position by longitudinal axially inwardly directed movement of the lever 15 from the control knob 50, as by pushing the outer end 52 inwardly toward the steering column.

For intermittent windshield wipe control applications, the control switch assembly 80 further includes a variable resistance element 85 whose resistance presented to an electronic timing and relay controller 86 is varied from a maximum to a minimum by an arcuately movable wiper arm portion on one of the poles 82 of the wiper switch assembly. Switch 80, as shown in FIGS. 8 and 12 comprises a rotary portion 81 and a stationary contact carrying portion 84 of which the rotary portion 81 is coupled to the pin 18 of the control lever 15 for movement over a limited range of rotational movement of the control knob 50 to between the OFF positional setting thereof and its aforesaid Lo-speed setting. The aforementioned electronic controller 86 includes a relay actuated switch, which controls the energization of the three brush, two-speed d.c. drive motor 88, and a cyclically operating electronic timing circuit, which sets the delay period between successive wiping or drive cycles of the windshield wiper motor 88 in accordance with the resistance setting of the variable resistor 85, as more fully described in U.S. Pat. No. 4,158,159 and of common ownership herewith.

Figure 13:
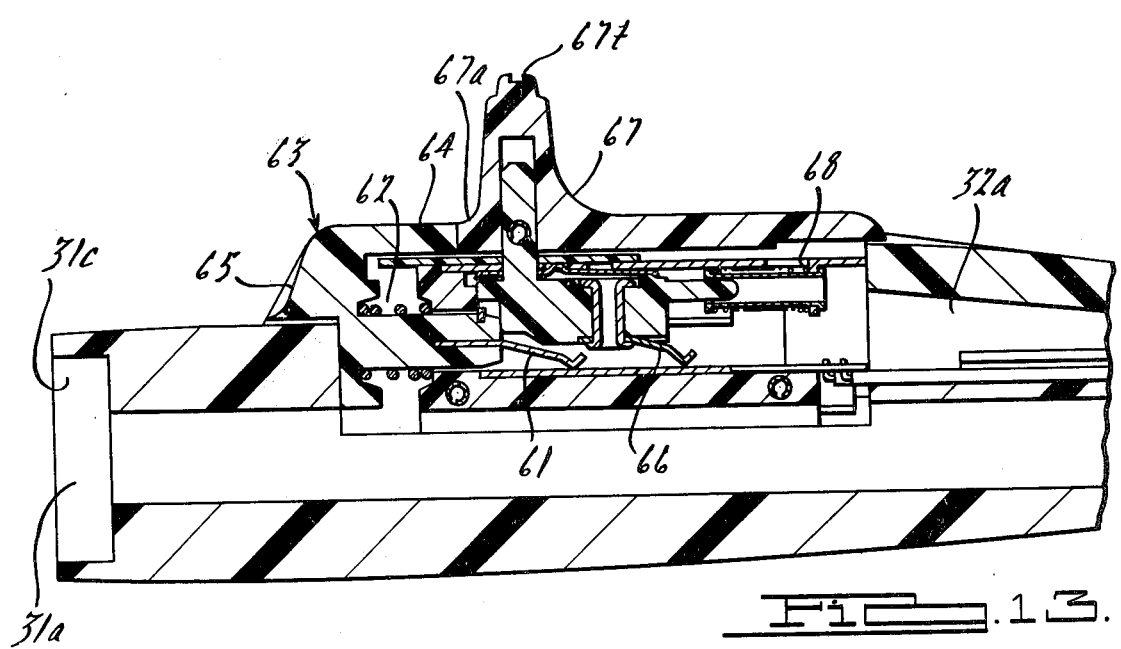
FIG. 13 is an enlarged sectional view of the operating control handle of FIG. 3 showing details of the plural slide switch assembly housed therein.

The speed control switch assembly 60, which is depicted electrically schematically in FIG. 10 herein, is shown mechanically in FIG. 13 as a plural slide switch assembly, which is received together with several electrical conductors 69 therefrom interiorly of the intermediate section 32 of the operating handle in the space between the lever 15 and the curved side walls 38, 39 of the aforesaid channel shaped opening therein. The switch assembly includes a pair of double pole slide switches, 61 and 66 of which switch 61 is the SET switch and switch 66 is the OFF-ON-RESUME switch. Switch 61 is movable by the first actuator button 63, labelled SET and against the bias of a spring, depicted at 62, from a first stable and switch contact completing position to a second and momentary contact circuit completing position from which it is returned to its first position by the aforesaid spring 62 upon release of the first actuator button 63. The other slide switch 66 is slidably movable conjointly with the first mentioned slide switch 61 by the first actuator button 63 or is movable independently of the first slide switch by a second actuator button 67 from a first stable or OFF position to a second stable and switch contact completing position, labelled ON. Switch 66 is further movable by the second actuator button 67 independently and exclusively of the first actuator button 63 and associated slide switch 61 to a third monentary switch contact position, labelled RESUME, from which it is returned to its second stable or ON position by a compression spring depicted at 68 upon release of the second actuator button 67, which is secured to the slidable or movable portion of the second slide switch 66.

The first actuator button 63 is shown in FIGS. 2, 3 and 13 as protruding from one end of the channel in the intermediate section 32 of the handle and as having an exposed pair of intersecting planar sides or surfaces, one of which surfaces 64 is parallel to the longitudinal axis of the handle and the other surface 65 is inclined to said axis and the surface 64. The second actuator button 67 includes an abutment portion 67a and a tab portion 67t of which the latter projects further outwardly of or is elevated above the flat horizontal surface 64 of the first actuator button as shown in FIGS. 3 and 13. The abutment portion 67a of the second actuator button 67 faces the end of the first actuator button 63 opposite the inclined surface or end 65 thereof and is so slightly spaced therefrom as to be in nearly line contact engagement therewith so that when the first actuator button 63 is pushed, as by application of a force to the oblique end 65 thereof, from its normal or stable position to its second position, the first actuator button will conjointly actuate and move the second actuator button and its associated slide switch from its first stable position, labelled OFF in FIG. 2, to its second stable position, labelled ON, without the necessity of separate actuation or movement of the second actuator button 67.

Release of the operator's thumb or finger from the first actuator button 63 will then cause the return of that button and first slide switch 61 to the first stable position under the influence of the return spring 62. However, the second actuator button 67 and slide switch 66 will remain in their second stable or ON position from which they can be further moved to the third position, labelled RESUME, which is a momentary contact position, by separate actuation of the tab portion 67t of the second actuator button by the thumb or finger of the operator.

Release of the tab portion 67t then returns the second actuator button and slide switch 66 from the aforesaid third position thereof under the influence of the spring 68 to the second or ON position of the second slide switch and actuator button.

As shown in the electrical schematic representation of the speed control slide switch assembly and external circuits controlled thereby, the slide switch 61 may be characterized as a D.P.D.T. or two position switch, while the slide switch 66 may be characterized as a D.P.T.T. (double pole triple throw) or three position switch. In the speed control application in which the slide switch assembly and operating control stalk handle are to be employed, the slide switch 61 is the SET speed switch, which is operated by the first actuator button 63, and the switch 66 is the OFF-ON-RESUME switch, which is operated between its three positions by the second actuator button 67 or between its OFF and ON positions by and conjointly with the first actuator button. The speed control switches operate in conjunction with a control servo 90, which includes a pair of electromagnet coils 91 and 93, a governor or vehicle speed actuated switch 94 and a brake or override switch 95. The governor switch 94 is operated to closed position when the vehicle attains a road speed of approximately 30 mph. Below this speed, the speed control system is disabled. Switch 95 is operated by the vehicle brake pedal to override the speed control function and permits the vehicle to be decelerated.

Assuming that the vehicle has attained a vehicle speed of or in excess of 30 mph and the operator desires to activate the speed control system, movement of switch 61, as by depressing the SET or first actuator button 63 inwardly toward the steering column and from its position shown to its second position, moves the second slide switch 66 from its OFF to its ON position and completes a circuit from B+ through the accessory feed of the ignition switch labelled I and through the movable bridging poles of switch 66 to a stationary switch contact labelled i of switch 66 and stationary contacts b and a of switch 61 to the holding coil 91 of the speed control servo 90, more fully described in U.S. Pat. No. 3,481,422.

Energization of the holding coil 91 closes its holding contacts 92 to maintain the energization of the coil when the SET switch 61 is returned to its first stable position by spring 62 upon release of the first actuator button 63. In this position of the switch 51, an energization circuit for the locking coil 93 of the servo is established from B+ through contacts a and c of switch 61 with the second slide switch 66 left in its second stable or ON position from the initial actuation of the SET switch. Thus, it will be noted that actuation of the SET button turns on the speed control system and simultaneously sets the vehicle speed.

Actuation of the brake switch 95 will drop out the holding coil 91 and its contact 92. So long as the vehicle speed does not drop below 30 mph and the second slide switch has not been returned to its OFF position, the speed control system will remain operative. The original speed set by the actuation of the SET button can be resumed by activation of the second actuator button 67 and moving the second slide switch 66 from its second or ON position to its third or RESUME position in which position the holding coil 91 will be reenergized through the contact g of slide switch 66. Slide switch 66 will then be returned to its ON position by spring 68 upon release of the second actuator button 67.

To select a higher or lower speed than that to which the system is set, the vehicle is accelerated, or decelerated by depression of the brake pedal, and the SET or first actuator button 63 is actuated to drop out the locking coil 93 momentarily and to reenergize it when the SET button actuated or first slide switch 61 is returned to its first stable position by the spring 62.

There has thus been described a steering column mounted control stalk having according to the invention, a control handle with an arrangement of actuators thereon, which provide four or five different speed control functions, including OFF, ON, RESUME and SET or a combined ON and SET, and five different windshield wiper motor and washer pump motor control functions, including OFF, variable Delay intermittent or interval wipe, Lo-speed continuous wipe, Hi-speed continuous wipe and Wash, from three closely located actuator buttons or control knobs conveniently mounted on the handle and capable of operation from one or, at most, but two fingers of the operator. The SET button, moreover, not only provides the speed select or SET function, but is also capable of simultaneously turning on the speed control system to provide a combined system turn ON and speed SET function from movement of but one button between only two positions. In addition, the control stalk is mounted for full and partial swingable movements in mutually orthogonally and related intersecting planes in one of which it is capable of providing Right and Left turn signalling functions from full or approximately ±12 degree swingable movements from a Neutral or OFF position as well as Right and Left Lane Change signalling functions from partial or approximately ±6 degree swingable movements of the control stalk in that plane. Full swingable movement of the control stalk in the other plane provides two additional functions including High beam and Low beam selection or headlamp dimming, while partial swingable movement in that plane provides an interrupted high beam signalling function for an "optical horn" type application.

What is claimed is:

1. In a vehicle a control stalk assembly mountable on the steering column of a vehicle and having an elongated, rotatable and axially translatable control lever extending transversely of the longitudinal axis of the steering column,
- an elongated hollow handle surrounding said lever and mounting a plurality of slidable, rotatable and axially translatable actuators thereon for operating a plurality of electrical switches controlling a plurality of operating functions in the vehicle,
- said handle having a pair of longitudinally slidably movable actuators thereon for a plural slide switch assembly receivable interiorly of said handle and including
    - a first actuator button attached to a first slide switch of said plural slide switch assembly and longitudinally slidably movable against the force of an internal biasing spring from a first stable position to a second unstable position from which it is returned to its first stable position upon release of the button and
    - a second actuator button affixed to a second slide switch of said plural slide switch assembly and having
        - a first portion located adjacent and in the path of movement of said first actuator button to be conjointly longitudinally slidably moved thereby from a first position corresponding to the first stable position of said first actuator button and its slide switch to a second stable position of the second actuator button and its slide switch corresponding to the second position of said first actuator button and its slide switch and an integral tab portion extending generally radially outwardly of said handle for longitudinal slideable movement of said second actuator button and its slide switch independently of said first actuator button and its slide switch and from the said first stable position of said second actuator button and its slide switch to the said second stable position of the latter slide switch, said second actuator button further movable exclusively of said first actuator button and its slide switch past the said second stable position of the second slide switch and against the force of another internal biasing spring to a third unstable switch position thereof from which it is returned to its second stable position upon release of the tab portion of that button, said handle further receiving a rotatable and axially translatable control knob located out of the path of movement of said first and second actuator buttons and projecting from the outer end of the handle opposite the steering column and secured to said rotatable and axially translatable control lever therein for independent rotational and separate axial translational movement of said lever relative to said handle for actuation from said control lever of a multiple rotatable and axially translatable switch assembly mounted adjacent the inner end of said handle.

2. Further in accordance with claim 1 wherein said first plural slide switch assembly is a vehicle speed control switch of which the first slide switch controls the setting of the vehicle speed upon actuation of the first slide switch from the first actuator button and wherein the second slide switch controls the OFF, ON and RESUME speed control functions and is actuated from its OFF to its ON control position by actuation of the first actuator button and is further actuated from its ON control position to its RESUME speed control position solely by actuation of said second actuator button.

3. Further in accordance with claim 1 wherein said another multiple switch assembly includes two distinct switches, one of which is a rotatable type switch and the other an axially operated switch, for a windshield wiper motor and a washer pump motor respectively, of which the windshield wiper motor switch is operated from rotational movement of the control lever and from an OFF position to a Lo-speed and from its Lo-speed position to a Hi-speed control position and the washer pump motor switch is operated upon axial translatable movement of the control lever.

4. Further in accordance with claim 1 wherein said control lever is attached to a motion translating assembly located near the upper end of said steering column which has
a vehicle turn signal switch mounted on the upper end thereof for actuation from said motion translating assembly about a first axis parallel to the longitudinal axis of the steering column by swingable movement of said handle and control lever in a first plane transverse to the longitudinal axis of the steering column and
a multiple beam headlamp selector switch mounted thereon for actuation by an elongated rod mounted for reciprocatory movement longitudinally of the steering column from said motion translating assembly by swingable movement of said handle and control lever in a second plane mutually orthogonally related to said first plane and containing the longitudinal axis of the steering column,
said motion translating assembly having
a first portion coupled to the turn signal switch for movement of the entire motion translating assembly about said first axis aligned with and corresponding to the axis of said turn signal switch and
a second portion coupled to said first portion for pivotal movement relative thereto about a second axis spaced from and normal to said first axis, said second portion of said motion translating assembly engaging said elongated rod for said headlamp beam dimmer switch.

5. Further in accordance with claim 4 wherein said turn signal switch has a movable actuator portion detachably secured to said first portion of said motion translating assembly for pivotal movement therewith about said first axis by said control lever.

6. Further in accordance with claim 4 wherein said movable actuator portion of said turn signal switch is fastened to said first portion of said motion translating assembly by a threaded screw fastener.

7. Further in accordance with claim 1 wherein said second slide switch is manually returnable from its second stable position to its first stable position from said tab portion thereof.

* * * * *